(12) United States Patent
Gerster

(10) Patent No.: US 7,893,367 B2
(45) Date of Patent: Feb. 22, 2011

(54) INFANT SCALE

(75) Inventor: Stephan Gerster, Wachtberg-Pech (DE)

(73) Assignee: Soehnle Professional GmbH & Co. KG, Backnang (DE)

( * ) Notice: Subject to any disclaimer, the term of this patent is extended or adjusted under 35 U.S.C. 154(b) by 124 days.

(21) Appl. No.: 12/184,501

(22) Filed: Aug. 1, 2008

(65) Prior Publication Data

US 2009/0173550 A1    Jul. 9, 2009

(51) Int. Cl.
*G01G 21/22* (2006.01)
*G01G 21/28* (2006.01)

(52) U.S. Cl. .................. 177/126; 177/238; 177/262
(58) Field of Classification Search ................. 177/126, 177/127, 262, 238, 244
See application file for complete search history.

(56) References Cited

U.S. PATENT DOCUMENTS

| | | | | |
|---|---|---|---|---|
| 1,275,911 | A * | 8/1918 | Hansen | 177/262 |
| 2,210,399 | A * | 8/1940 | Ericksen | 177/126 |
| 2,931,640 | A * | 4/1960 | Riddle, Jr. | 177/262 |
| D274,991 | S * | 8/1984 | Wirtz | D10/92 |
| 4,711,313 | A * | 12/1987 | Iida et al. | 177/127 |
| 4,800,973 | A * | 1/1989 | Angel | 177/211 |
| D304,308 | S * | 10/1989 | Morooka | D10/92 |
| 5,499,457 | A | 3/1996 | Weiler et al. | |
| 5,637,838 | A | 6/1997 | Arey et al. | |
| 6,256,896 | B1 | 7/2001 | Landauer | |
| 6,998,543 | B2 * | 2/2006 | Sugrue et al. | 177/126 |
| 7,199,311 | B1 * | 4/2007 | Buckner et al. | 177/144 |
| 7,235,746 | B2 * | 6/2007 | Williamson | 177/126 |
| 7,683,272 | B2 * | 3/2010 | Hong | 177/126 |
| 2009/0114455 | A1 | 5/2009 | Mueller et al. | |
| 2009/0294184 | A1 * | 12/2009 | Gerster et al. | 177/126 |
| 2010/0005675 | A1 | 1/2010 | Gerster | |

FOREIGN PATENT DOCUMENTS

| | | |
|---|---|---|
| DE | 296 11 425 U1 | 11/1997 |
| DE | 29616144 | 1/1998 |
| DE | 102006031950 B3 | 11/2007 |
| FR | 2645956 A1 | 10/1990 |
| FR | 2675255 A1 | 10/1992 |
| FR | 2708343 A1 | 2/1995 |
| WO | 2004038890 A1 | 5/2004 |

* cited by examiner

*Primary Examiner*—Randy W Gibson
(74) *Attorney, Agent, or Firm*—Leydig, Voit & Mayer, Ltd.

(57) ABSTRACT

An infant scale includes a scale pan configured to hold an infant and including first and second pan halves foldable against each other from an unfolded weighing position to a folded-up storage position. A measuring device is configured to support the scale pan and to determine a weight of the infant. The measuring device includes a plurality of load cells. A display is configured to show the determined weight.

23 Claims, 6 Drawing Sheets

INFANT SCALE

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

This is a U.S. National Phase Application under 35 U.S.C. §371 of International Application No. PCT/DE 2007/000206, filed on Feb. 1, 2007, which claims priority to German Applications No. DE 10 2006 004 962.4, filed on Feb. 1, 2006, DE 10 2006 004 961.6, filed on Feb. 1, 2006, and DE 10 2006 034 871.0, filed on Jul. 25, 2006. The International Application was published in German on Aug. 9, 2007 as WO 2007/087799.

The invention relates to an infant scale with a scale pan to hold an infant, a measuring device supporting the scale pan to determine the infant's weight, and a display to show the weight as determined, with the measuring device comprising several load cells.

BACKGROUND

Infant scales having a scale pan to hold the infant have been known for a long time from practical experience. Reference is made to DE 296 11 425 U1 solely as an example. Even though a flat design of the scale pan is possible there, the known infant scale requires considerable storage space which is predetermined by the size of the infant to be weighed and the scale pan necessary therefore. To that extent, the known infant scale is suitable for traveling only to a limited extent. For use at home, the infant scale requires considerable storage space as well, making in-home use problematic not only in light of the required storage space.

SUMMARY

An aspect of the present invention is to provide an infant scale in such a way that is suited for traveling and/or requires a relatively small storage space and/or is easily transportable.

In an embodiment, the present invention provides an infant scale including a scale pan configured to hold an infant and including first and second pan halves foldable against each other from an unfolded weighing position to a folded-up storage position. A measuring device is configured to support the scale pan and to determine a weight of the infant, the measuring device including a plurality of load cells. A display is configured to show the determined weight.

DETAILED DESCRIPTION

Figure 1:
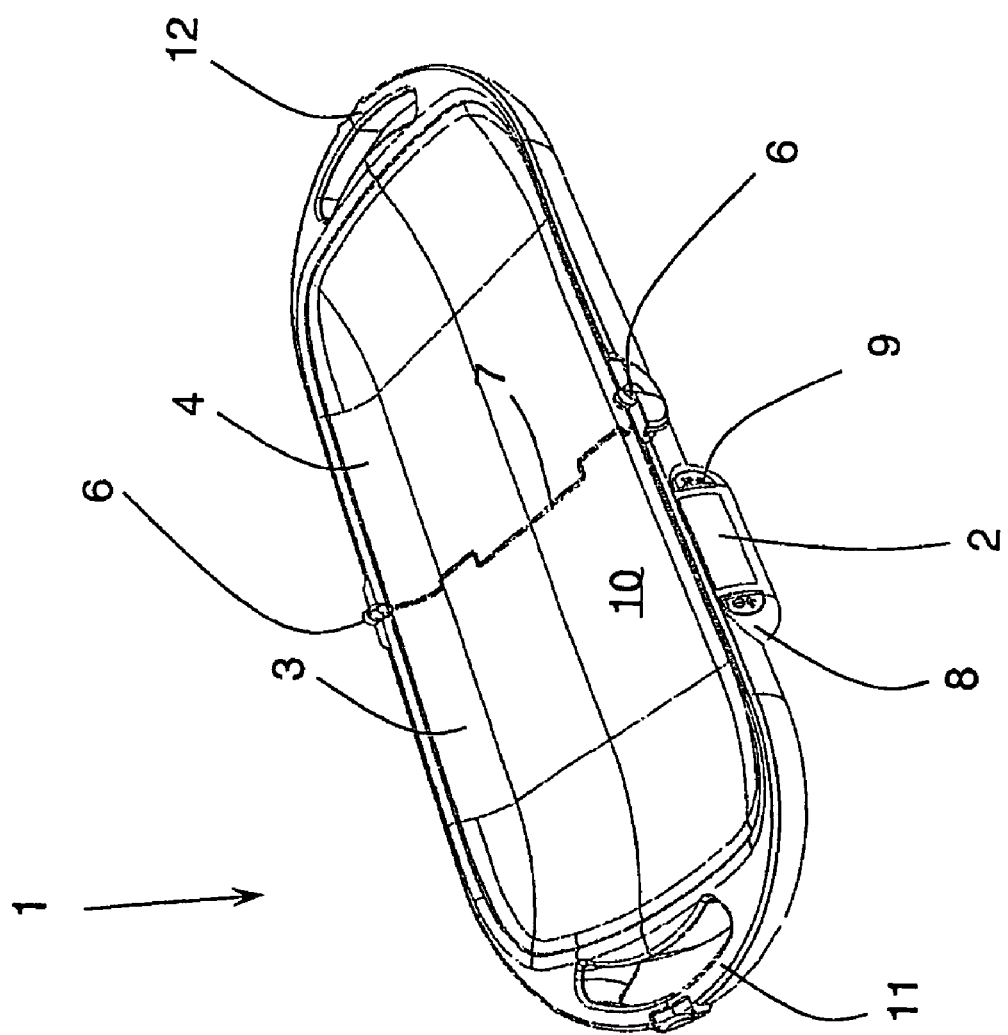
FIGS. 1 and 2 show in a schematic view a first embodiment of an infant scale in accordance with the invention in its unfolded state.

In an embodiment, the present invention provides an infant scale with a scale pan to hold an infant, a measuring device supporting the scale pan to determine the infant's weight, and a display to show the weight as determined, with the measuring device comprising several load cells, designed in such a way that it will be easily transportable and thus particularly suitable for traveling, and requiring the smallest possible storage space.

The scale pan is advantageous with regard to the storage space. To that end, the scale pan is divided into two scale halves that can be folded against each other and can be converted from an unfolded weighing position to a folded storage position. In other words, the scale pan has the required size in its unfolded state, namely to accommodate the infant to be weighed. In its folded state, the entire arrangement is only half as long which makes the infant scale ideally suitable for traveling. Moreover, the interior side of the scale pan which serves to hold the infant is protected in its folded state, thereby effectively preventing any damage to the usually softer surface material.

In principle, it is possible to design the two pan halves independently of each other, with the two halves being stuck together to create the unfolded weighing position, and, if necessary, locked in position. In a preferred embodiment, the pan halves are connected with each other in articulated fashion, allowing them to be unfolded against each other and to be locked in the weighing position. Together, the two pan halves form the scale pan to accommodate the infant.

As mentioned above, it is preferable if the two pan halves are lockable against each other in their unfolded weighing position as well as in their folded storage position. Both cases result in safe handling, in particular in the unfolded weighing position in which the scale pan serves to accommodate the infant to be weighed.

From a design point of view, it is preferable if the two pan halves together form a joint line in the unfolded position, with the pan halves—completely or partially—being lockable with each other or, respectively, against each other along this joint line. By realizing such a joint line, in particular in the case of surfaces that abut each other as closely as possible, a homogeneous scale pan can be created without undesirable transitions between the two pan halves.

At this point it should be noted that the pan halves are preferably made of a synthetic material, preferably of a hard synthetic. One option would be to produce the two pan halves by way of injection molding. It is also conceivable to extrude the pan halves or to manufacture them by means of a cupping process. Particularly within the framework of injection molding production, the interior surface of the pan half could be equipped with a softer synthetic by means of the so-called over molding method so that production is carried out in a single process.

It is furthermore possible to pad the pan halves on their interior side, with the padding perhaps being installed directly on the surface of the pan halves. It is equally conceivable that the padding is removable. In any event, it should be moisture-repellent and washable. A padding made of a soft synthetic that could be attached permanently or in removable fashion is advisable.

The infant scale essentially consists of the scale pan which in turn is composed of two pan halves. To set up the scale pan, the outside of the pan halves are provided in further advantageous fashion with feet that may be executed in the form of plastic nubs or the like. The feet are preferably placed on the external surface of the pan halves and, in further advantageous fashion, are positioned in such a way that they will keep the pan halves, and thus the scale pan, in its weighing position when it is set up. A kind of forced positioning of the pan halves relative to each other may be achieved by a suitable arrangement of the feet without the need for a separate arresting or locking mechanism, or at least supporting the latter. In the concrete case, three feet are provided for each pan half, in which context it is advantageous if two feet each are arranged opposite each other near the connecting area between the pan halves.

At the beginning it has already been stated that the measuring device comprises several load cells. Correspondingly, it is particularly advantageous if the feet contain electric load cells so that they may jointly serve the determination of the weight as a component of the measuring device for the determination of the weight. The processing of the measuring data takes place in an integrated processor.

The infant scale moreover comprises a display for the weight as determined. A preferred embodiment is to provide for it in one of the pan halves, i.e. preferably on the outside in the rim area of the pan half. The display may be designed as an LCD.

In addition, an on/off switch is provided which is preferably arranged next to the display. It should be noted that the infant scale in accordance with the invention may also be equipped with a memory function in order to archive or, respectively, to store the weight development of the infant and to be able to record a continuous comparison or, respectively, the development of the child with regard to its weight. Any storage media may be utilized therefore. The weight development can be represented on the display by means of flow numbers, in which context it is quite conceivable that the weight progression is shown in the form of a graph.

The display and, if necessary, the on/off switch may be arranged in a housing-like bulge of one of the pan halves, with this bulge to be understood in the sense of an integrated housing. In a preferred embodiment, this bulge or, respectively, this housing can be opened from the interior side of the scale pan.

The area provided for the display or, respectively, the bulge serving this purpose may contain the entire electronic system together with a battery or rechargeable battery. Likewise, a power supply may also be housed there.

In an additional preferred embodiment, the two pan halves that form the scale pan in their unfolded state form a kind of housing in their folded state that comprises an interior space. Within the framework of a preferred embodiment, this housing formed by the pan halves are at least partially open in the area of the mutual connection of the pan halves. This opening results from the bulging shape of the pan halves. The opening in the housing created in this manner can be closed by a lockable insert, with the insert extending into the housing together with a storage space formed by a circumferential wall. On the one hand, the insert serves to close the housing and, on the other hand, to store infant accessories. To give an example, the insert could be provided with pre-shaped sections to accommodate infant bottles. To this extent it is further advantageous if the insert is thermally insulated at least in certain sections.

It is furthermore advantageous if the insert forms a bottom part of the folded-up pan halves and thus for the housing that is formed thereby to make it possible to set the housing upright. In this way, the housing can be positioned or, respectively, handled similarly to a carrying bag. To this end, the housing has an upper carrying handle that, in the unfolded state, is formed by the two pan halves or, respectively, by handle parts attached or formed there.

Figure 2:
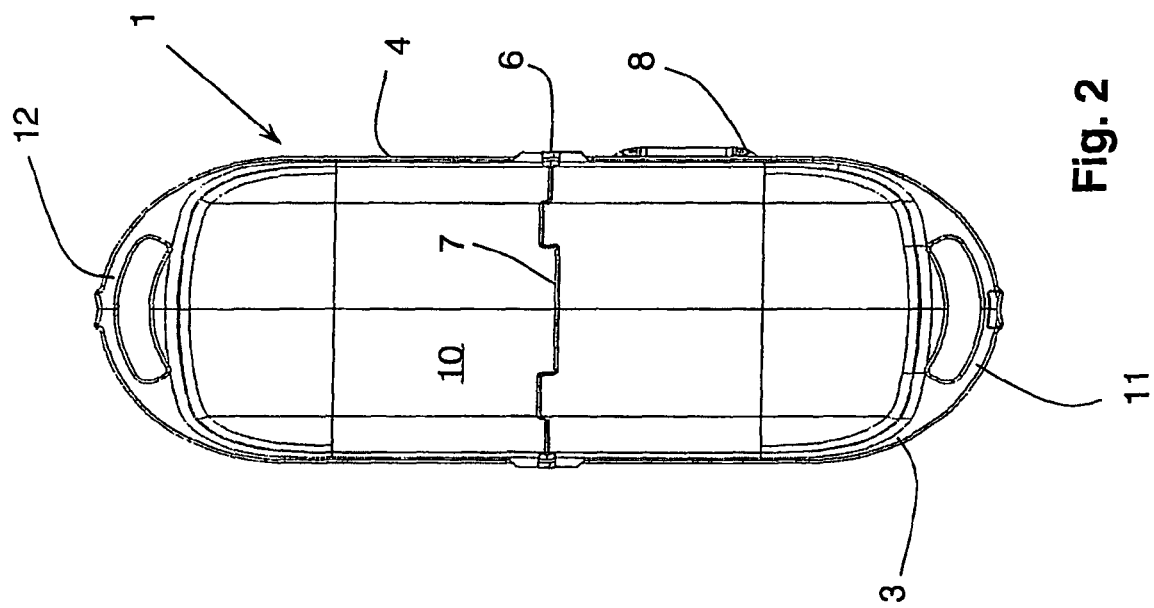

In the drawings, FIGS. 1 and 2 show in a schematic view an infant scale with a scale pan 1 to accommodate an infant. The scale pan 1 is supported by a measuring device not shown in FIGS. 1 and 2, with the measuring device serving to determine the weight of the infant. In addition, a display 2 is provided to show the weight as determined. The measuring device comprises several load cells that can not be discerned in FIGS. 1 and 2.

Figure 3:
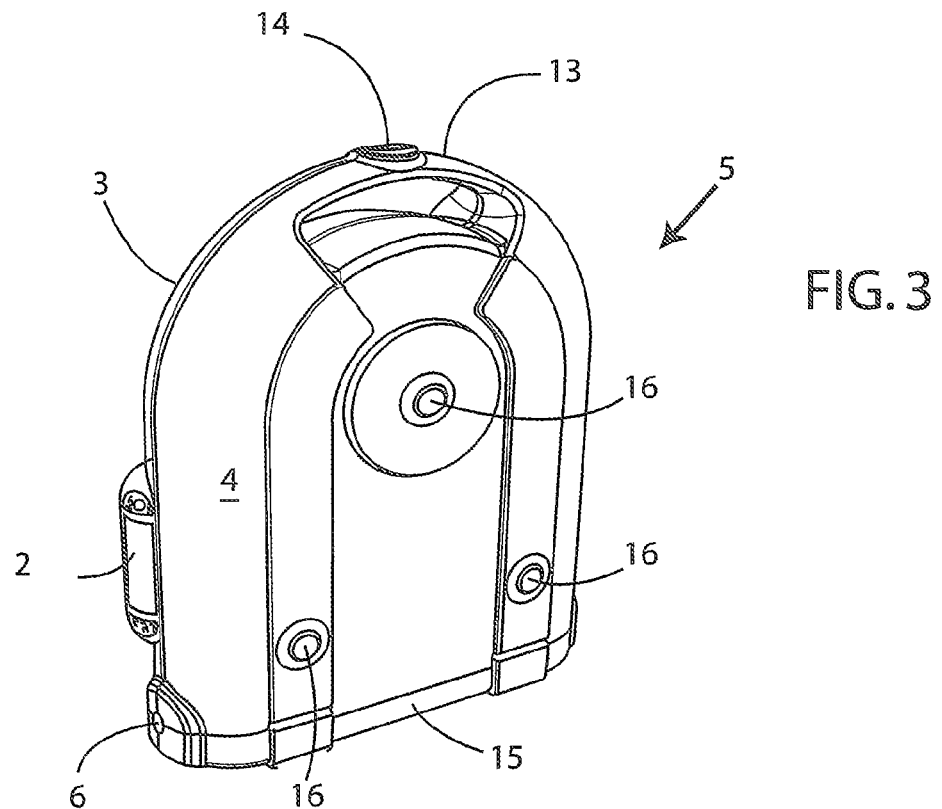
FIGS. 3 and 4 show the object from FIGS. 1 and 2 in its folded-up state together with its bottom part.
Figure 4:
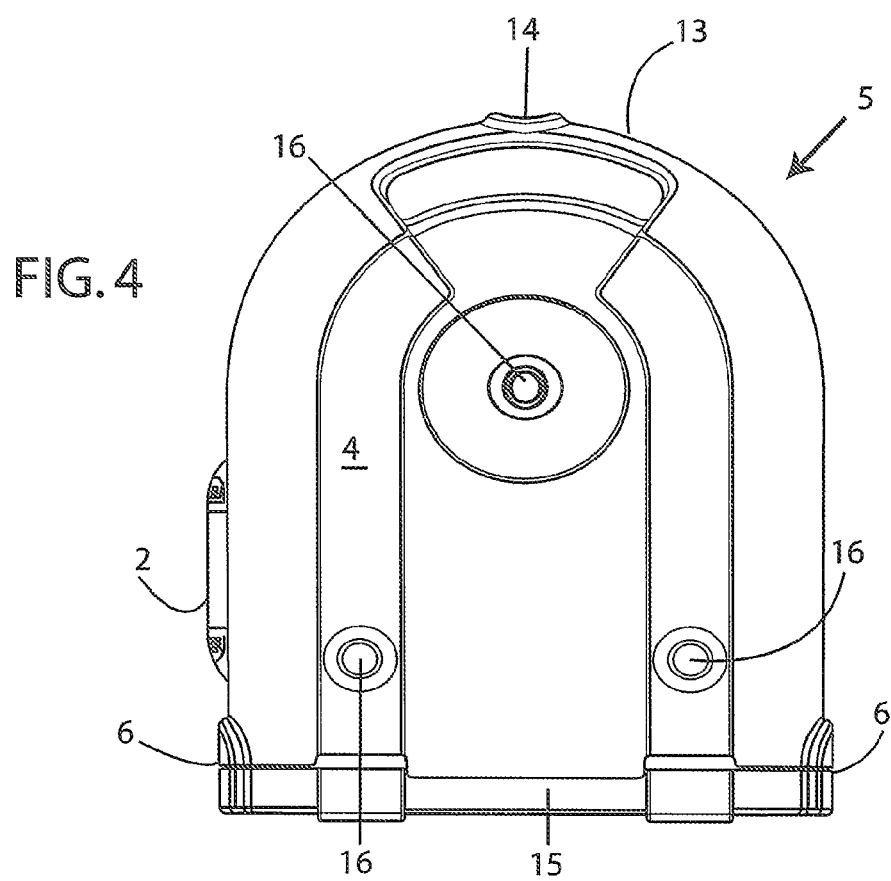

FIGS. 1 and 2 show in particularly clear fashion that the scale pan 1 comprises two pan halves 3, 4, with the two pan halves 3, 4 being foldable against each other. In this way, the two pan halves 3, 4 can be folded from an unfolded weighing position shown in FIGS. 1 and 2 to a folded-up storage position shown in FIGS. 3 and 4, with the pan halves 3, 4 forming a housing 5 in their folded-up state as shown in FIGS. 3 and 4.

FIGS. 1 and 2 moreover indicate that the pan halves 3, 4 are connected to each other in articulated fashion, namely via hinges 6 arranged on the rim. In between, the two pan halves 3, 4 abut each other along a interstice 7, whereby the interstice may follow a meshing of the two pan halves 3, 4.

FIGS. 1 and 2 show furthermore that the display 2 is allocated to the pan half 3, attached in a housing-like bulging 8. An on/off switch is provided there as well.

The scale pan 1 or, respectively, the two pan halves 3, 4 are made of a hard synthetic material. A padding 10 is provided on the interior side which may be an integral component of the pan halves 3, 4 or, respectively, of the scale pan 1. A removable or, respectively, replaceable form of the padding 10 is conceivable as well. Moreover, it will be possible to spread out the padding 10 on the interior side of the scale pan 1 after the pan halves have been unfolded, with the effect that the interstice 7 is completely covered by the padding 10.

FIGS. 1 and 2 furthermore show that the pan halves 3, 4 are equipped with handle parts 11, 12 that form one single handle in the folded-up state as shown in FIGS. 3 and 4. Moreover, a locking mechanism 14 is provided on the handle part 11 that serves to open and close the two pan halves 3, 4.

FIGS. 3 and 4 show the two pan halves 3, 4 in their folded-up position, thereby forming the aforementioned housing 5. This housing 5 is open in the area of the mutual connection, i.e. in the area between the two hinges 6; in the representations in FIGS. 3 and 4 it is closed by a special insert 15. The insert simultaneously serves as a base or, respectively, as a bottom part so that the housing 5 formed in the closed state of the pan halves 3, 4 can be set upright.

It may furthermore be noted that the insert 15. serves to accommodate any accessories, for example of infant bottles, and may therefore be thermally insulated. Also, the insert 15 is locked in or, respectively, arrested when inserted into the housing 5, whereby an unintentional sliding out of the insert 15 is effectively prevented. It is also conceivable that the insert is jammed or, respectively, arrested upon the closing of the pan halves 3, 4 so that a secure fixed position of the insert 15 is assured by means of the closing action of the pan halves 3, 4.

FIGS. 3 and 4 furthermore clearly show that the pan halves 3, 4 are each provided with feet 16 on their undersides that serve a secure positioning of the pan halves 3, 4, particularly in the unfolded state, and thus serve a secure positioning of the scale pan 1. The feet contain integrated load cells that are part of the measuring device.

Figure 5:
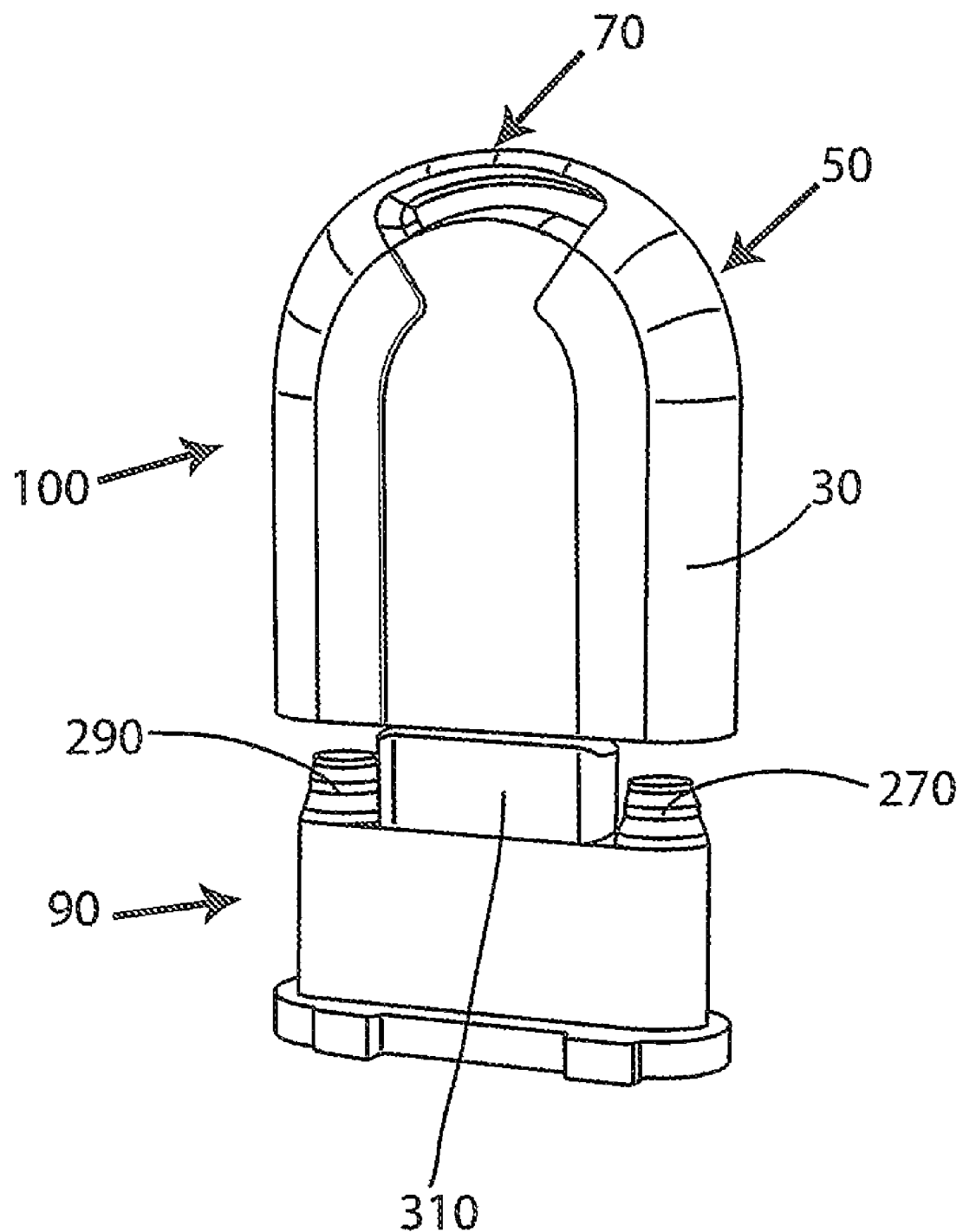
FIG. 5 shows in a schematic view a second embodiment of an infant scale in accordance with the invention in its folded-up state, but with the insert for accessories being pulled out.

FIG. 5 shows a second embodiment of a scale in accordance with the invention that is executed as an infant scale in the transport position, however with the insert removed. The scale has a scale pan 100 that comprises a first scale pan part 30 and a second scale pan part—not visible in this drawing—that bears the reference mark 50 in the subsequent drawings. The first and second scale pan parts 30, 50 are executed as half shells of equal size which in their transport position are convex towards the exterior. They are each equipped with a cutout. The cutouts form a handle 70 in the transport position.

FIG. 5 shows the scale with a pull-out device 90 to store infant care products. The device 90 for the storage of infant care products can be inserted and locked between the two scale pan parts of the folded-up. scale pan. In this transport position, the support surface of the scale pan as well as the device 90 for the storage of infant care products are protected from external environmental impacts. Each has a space for a powder bottle 270, an oil bottle 290, and for diapers 310.

Figure 6:
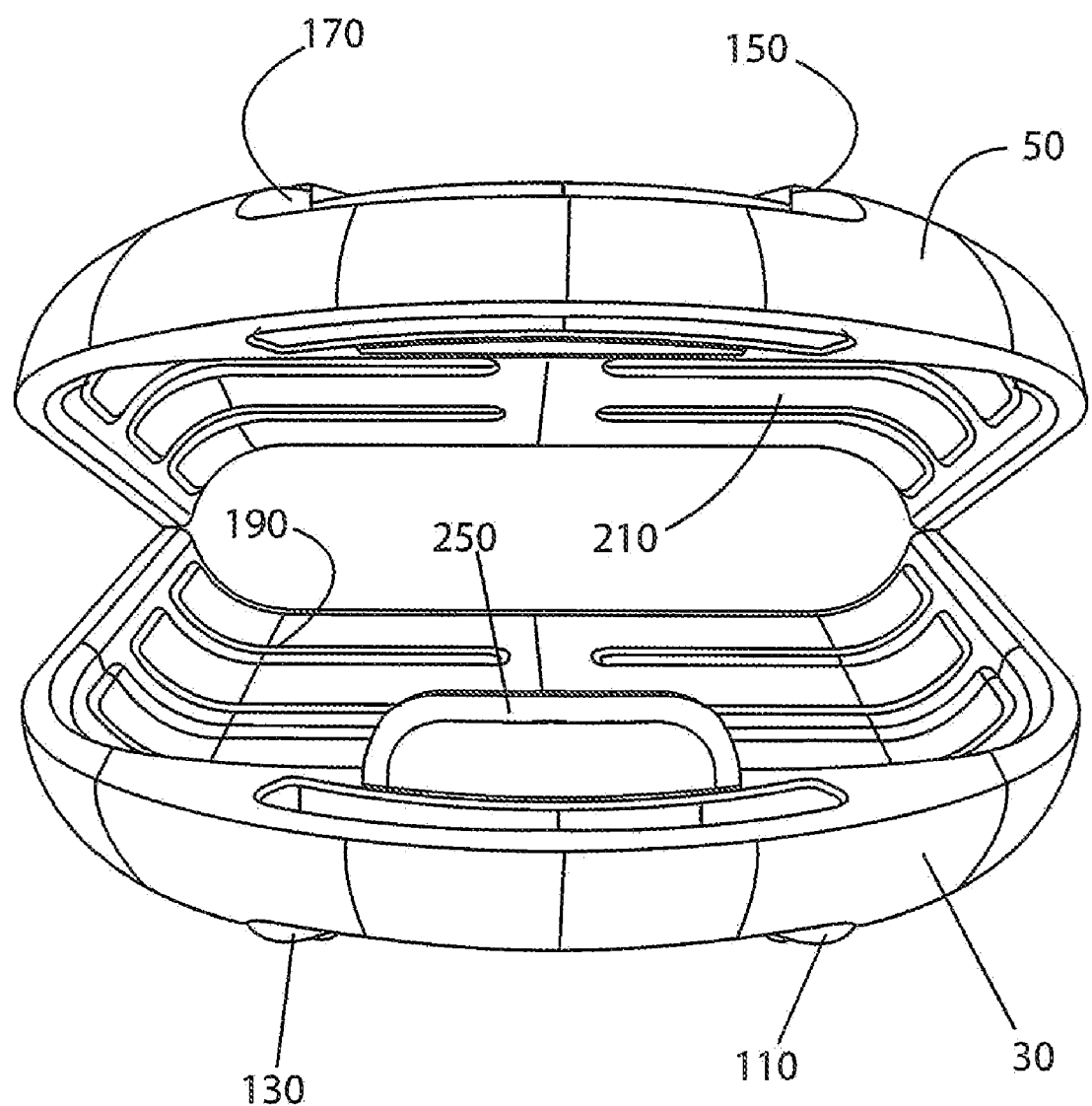
FIG. 6 shows the object of FIG. 5 without insert and partially opened.

FIG. 5 shows the scale pan 100 with the first scale pan part 30 and the second scale pan part 50. The first scale pan part 30 and the second scale pan part 50 are connected to each other in articulated fashion. When in use, they can be locked with each other in reversible fashion. FIG. 6 shows the first scale pan part 30 has a first support foot 110 and a second support foot 130. The second scale pan part 50 has a third support foot 150 and a fourth support foot 170. The support feet 110, 130, 150, 170 are each equipped with a load cell not shown in the figure. The first scale pan part 30 and the second scale pan part 50 are equipped on the interior with a first concave side 190 or, respectively, with a second concave side 210. When in use, the first concave side 190, together with the second concave side 210, forms the support surface of the scale pan 100. In addition, a concealable display 250 to show a weight reading is implemented in the first scale pan part.

Figure 7:
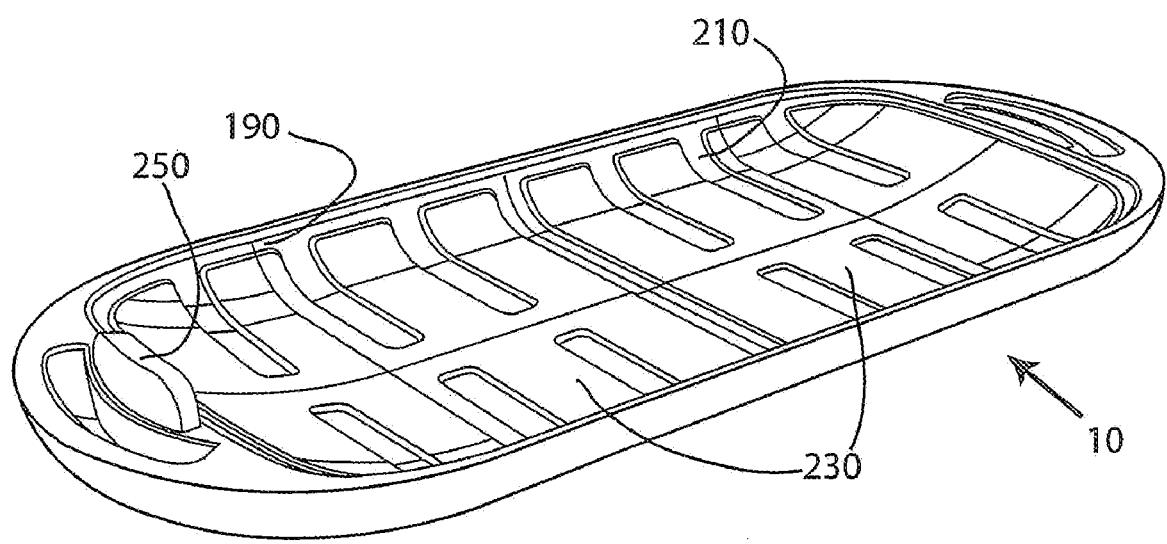
FIG. 7 shows the object of FIGS. 1 and 6 in its unfolded state, similar to the representation in FIG. 1.

FIG. 7 shows the scale in accordance with the invention in its position when in use, i.e. in the unfolded state. It can clearly be seen that the concave interior sides 190, 210 of the first scale pan part 30 and of the second scale pan part 50 form the support surface 230 of the scale pan 100.

With regard to additional advantageous embodiments of the device in accordance with the invention and for the sake of avoiding any repetitions, reference is made to the general part of the description as well as to the attached patent claims.

Finally, may it be expressly pointed out that the embodiment of the infant scale in accordance with the invention described above merely serves to discuss the invention but does not limit the latter to the embodiment.

What is claimed is:

1. An infant scale comprising:
a scale pan configured to hold an infant and including first and second pan halves foldable against each other from an unfolded weighing position to a folded-up storage position, the pan halves forming an interstice in the unfolded weighing position and being one of lockable with each other and lockable against each other in the unfolded weighing position along the interstice;
a measuring device configured to support the scale pan and to determine a weight of the infant, the measuring device including a plurality of load cells; and
a display configured to show the determined weight.

2. The infant scale as recited in claim 1, wherein the pan halves are connected articulately to each other.

3. The infant scale as recited in claim 1, wherein the pan halves include a hard synthetic material.

4. The infant scale as recited in claim 1, wherein the pan halves include padding disposed on an inside surface of the pan halves.

5. The infant scale as recited in claim 4, wherein the padding is moisture-repellant and washable and includes a soft synthetic material.

6. The infant scale as recited in claim 1, further comprising at least one foot disposed on an exterior surface of the pan halves configured to support the pan halves in the unfolded weighing position.

7. The infant scale as recited in claim 6, wherein the at least one foot includes at least three feet disposed on each of the pan halves across from each other near a connecting area between the pan halves.

8. The infant scale as recited in claim 6, wherein at least one of the plurality of load cells is disposed in the at least one foot.

9. The infant scale as recited in claim 1, wherein the display includes an LCD disposed in one of the pan halves.

10. The infant scale as recited in claim 9, further comprising an on/off switch disposed next to the display.

11. The infant scale as recited in claim 9, wherein the display is disposed in a housing-like bulging of one of the pan halves.

12. The infant scale as recited in claim 11, wherein the housing-like bulging is openable from an inside surface of the one of the pan halves.

13. The infant scale as recited in claim 11, wherein the housing-like bulging is configured to receive an electronic system and a battery.

14. The infant scale as recited in claim 1, wherein the pan halves form a housing in the folded-up storage position.

15. An infant scale comprising:
a scale pan configured to hold an infant and including first and second pan halves foldable against each other from an unfolded weighing position to a folded-up storage position;
a measuring device configured to support the scale pan and to determine a weight of the infant, the measuring device including a plurality of load cells; and
a display configured to show the determined weight,
wherein the pan halves form a housing in the folded-up storage position, and
wherein the housing is at least partially open and forms an opening near a connecting area of the pan halves.

16. The infant scale as recited in claim 15, wherein the pan halves are configured to be lockable relative to each other in the unfolded weighing position and in the folded-up storage position.

17. The infant scale as recited in claim 15, further comprising a lockable insert configured to close the opening.

18. The infant scale as recited in claim 17, wherein the lockable insert extends into the housing and includes a storage space formed by a circumferential wall.

19. The infant scale as recited in claim 18, wherein the storage space is configured to hold accessories for babies.

20. The infant scale as recited in claim 18, wherein the lockable insert includes at least one molded section configured to accommodate at least one infant bottle.

21. The infant scale as recited in claim 20, wherein at least a portion of the lockable insert is thermally insulated.

22. The infant scale as recited in claim 17, wherein the lockable insert forms a bottom part useable to dispose the housing in an upright position.

23. The infant scale as recited in claim 1, wherein the housing includes a first and a second handle part disposed respectively on the pan halves, the handle parts configured to form an upper carrying handle in the folded-up storage position.

* * * * *

UNITED STATES PATENT AND TRADEMARK OFFICE
CERTIFICATE OF CORRECTION

PATENT NO. : 7,893,367 B2  
APPLICATION NO. : 12/184501  
DATED : February 22, 2011  
INVENTOR(S) : Stephan Gerster It is certified that error appears in the above-identified patent and that said Letters Patent is hereby corrected as shown below:

Title Page 1, include Item "(63) Related U.S. Application Data  
Continuation of International Application No. PCT/DE2007/000206, filed on Feb. 1, 2007."

Title Page 1, include Item "(30) Foreign Application Priority Data  
Feb. 1, 2006 (DE)...................... 10 2006 004 961  
Feb. 1, 2006 (DE)...................... 10 2006 004 962  
Jul. 25, 2006 (DE)...................... 10 2006 034 871"

Column 1, lines 12-13, replace "U.S. National Phase Application under 35 U.S.C. § 371" –with—"continuation"

Signed and Sealed this  
Twenty-fifth Day of October, 2011

David J. Kappos  
*Director of the United States Patent and Trademark Office*